3,260,607
PREPARATION OF DEHYDRATED COOKED MASHED POTATO

Edward A. M. Asselbergs, Hugh A. Hamilton, and Patricia Saidak, Ottawa, Ontario, Canada, assignors to Canadian Patents and Development Limited, Ottawa, Ontario, Canada
No Drawing. Filed Jan. 15, 1962, Ser. No. 166,243
Claims priority, application Canada, Feb. 7, 1961, 816,400
1 Claim. (Cl. 99—207)

The present invention relates to a process for the production of a dehydrated cooked mashed potato product of the kind commonly referred to as "instant" mashed potato.

Considerable interest is presently being shown in improved instant mashed potato products because they are finding good consumer acceptance and are therefore helping to arrest the decline in consumption of potatoes which has been observed during recent years. Also, the establishment close to potato growing regions of a factory for the production of such an instant mashed potato product enables economical use to be made of potatoes which could not be economically transported over the long distances which in many cases separate the potato growing regions from the large cities. The instant mashed potato produced from such potatoes can be shipped over long distances at relatively low freight rates. Furthermore, the instant mashed potato can be stored for long periods.

One type of instant mashed potato consists of granules which are obtained by spraying hot mashed potatoes through a fine nozzle into a heated chamber. A second type of instant mashed potato is in the form of flakes. According to Canadian Patent No. 561,119 this second type may be produced by dehydrating cooked mashed potatoes on a heated surface in a film substantially of unicellular thickness. The product so obtained consists of flakes of substantially unicellular thickness.

It is an object of the present invention to provide a new type of instant mashed potato having a physical structure differing from the granular and flake products of the prior art.

The invention provides a process for the production of a dehydrated cooked mashed potato product comprising forming a perforated layer of mashed potato and drying said layer on a heated surface to form crystal-like particles having an average thickness of from about three to about four potato cell thicknesses.

The invention further provides a process for the production of a dehydrated cooked mashed potato product comprising cutting potatoes into pieces of such size that cooking thereof can be effected by exposure to an aqueous cooking medium at a temperature in the vicinity of the boiling point of water for a period of less than about 15 minutes, exposing said pieces of potato to an aqueous cooking medium at a temperature in the vicinity of the boiling point of water until cooking thereof is effected, mashing the cooked pieces of potato, forming a continuous but perforated layer of mashed potato and drying said layer on a heated surface to form crystal-like particles having an average thickness of from about three to about four potato cell thicknesses.

Emphasis has been laid in the prior art on the use of a prolonged cooking period at relatively low temperatures. By contrast, for obtaining the product of the present invention, a relatively short cooking period is preferably used. Advantageously this is not more than 15 minutes and ins preferably about 7 to about 10 minutes. The aqueous cooking medium which is used can be steam or water, the latter being preferred. A temperature of from about 210° F. to 212° F. is generally used although some departure upwardly or downwardly from this range is permissible and a temperature equal to the boiling point of water, which of course depends on the prevailing atmospheric pressure, can almost invariably be utilized.

In order to ensure that cooking of the potatoes is effected in less than the prescribed preferable maximum cooking time of 15 minutes, it is necessary to cut the potatoes into pieces of relatively small cross section. Conveniently these pieces can be in the form of "French-fry" strips which generally have a cross-section of about ⅜ inch by ⅜ inch.

Advantageously the cooked pieces of potato are subjected to a "fluffing" procedure prior to being mashed. This involves causing circulation of air around the pieces of potato to disperse the moisture-laden microatmosphere surrounding each piece of potato and facilitate removal of moisture from the surface of the potato. The "fluffing" operation can conveniently be carried out by spreading the pieces of potato on a perforated screen and blowing air over them. Alternatively the pieces of potato may be tumbled in a rotating wire basket in which case the resulting agitation of the pieces of potato serves to disperse the microatmosphere mentioned above and no current of air need be supplied.

The formation of the layer of mashed potato can be effected by forcing the mashed potato through any slot of suitable width. However, the preferred method of producing the layer is to pass the mashed potato through the nip between two roller members. Advantageously, the roller members take the form of rotatable heated drums, a layer of mashed potato then being formed on each of the drums, and drying of the layers of mashed potato is actually effected on the drum.

Experiments with several varieties of Sebago and Kathahdin potatoes grown in various parts of Canada have shown that two perforated layers of mashed potato are formed (one on each drum) when mashed potato is passed through the nip between two rotating drums having a clearance between the drums of from about .003 to about .004 inch and that an excellent instant mashed potato product is obtained by drying these layers. This is surprising since according to Canadian Patent No. 561,119 feeding mashed potato between two drums with a drum separation of .004 inch results in the formation of an unsatisfactory product. Furthermore, according to this patent a film of cooked mashed potato which when dried forms flakes of substantially unicellular thickness, rather than crystal-like particles having an average thickness of from three to four potato cells as in the present invention, can be obtained by squeezing mashed potato between two rotating drums with a drum clearance of considerably greater than .004 inch, for example with a drum clearance of .007 to .009 inch. The differences between our finding and those set out in Canadian Patent No. 561,119 can possibly be attributed to the fact that according to the present invention a short cooking period is preferably used and that the specific experiments described in Canadian Patent No. 561,119 were carried out on Idaho Russet potatoes.

The perforated layer of mashed potato which is formed and dried according to the present invention has an appearance resembling that of fine lace work and readily breaks up to give crystal-like particles of instant potato which resemble nothing so much as snow crystals. The product is of course not truly crystalline and the adjective "crystal-like" used in this specification and in the appended claim must be interpreted as referring to the visual appearance of the instant mashed potato of the invention rather than to its physical constitution.

Our experiments have shown that when the mashed potato is fed between two rotating drums with a clearance between the rotating drums of about .001 inch practically none of the mashed potato passes through the nip between the drums. Between about .001 inch and about .002 inch increasing amount of mashed potato pass through. With a drum clearance of about .002 inch the formation on each drum of a continuous perforated layer of mashed potato commences on each drum. On increasing the drum clearance to more than about four thousandths of an inch the perforated nature of the layer of mashed potato rapidly begins to disappear until with a drum clearance of about .008 inch a continuous substantially imperforate layer of mashed potato is produced.

If the continuous imperforate layer just referred to is dried and comminuted, flakes are obtained which somewhat resemble the flaky products of the prior art. This is to be avoided since it is an object of the invention to produce an instant mashed potato product which has a crystal-like texture and accordingly the drum clearance should be maintained so as to produce a continuous but perforated layer of mashed potato, this clearance preferably being from about .002 inch to about .004 inch. It is only from such a perforated layer that the crystal-like product of the invention is obtainable.

The thinness of the layer of mashed potato from which the crystal-like product of the invention is produced means that a lower throughput of mashed potato would be achieved than when using the thick films of the prior art if it were only possible to dry the perforated layer of the present invention at the same speed as the films of the prior art. However, it is found that the perforated layer of mashed potato can be dried more rapidly than the thicker films of the prior art. Therefore, throughputs are obtainable which are equivalent to the throughputs of the prior art. For example, when using rotating heated drum dryers it is possible to operate with a higher speed of drum rotation than can be used in prior art processes.

Because of the open texture of the crystal-like product of the invention the product is found to rehydrate very readily and with a minimum of stirring. As a result, the reconstituted product is uniformly moist and is free from the disadvantage, encountered with some of the products of the prior art, of containing lumpy portions which have absorbed less water or other added liquid than the remainder of the product. A grainy appearance is also avoided.

The following example is given by way of illustration and without limitation.

*Example*

Freshly dug potatoes of the Sebago variety grown in Prince Edward Island, were peeled in an abrasion peeler and trimmed to remove defects such as eyes and spots. They were then sliced into "French-fry" portions consisting of strips of potato having a cross-section of ⅜ inch by ⅜ inch. Cooking of the potatoes was then carried out in boiling water in a steam jacketed kettle of stainless steel with a weight ratio of water to potatoes of about 1 to 1. The cooking time was 6.5 minutes.

After draining off the water the potato strips were spread out on a perforated screen and air at room temperature blown over them. This had the effect of forcibly removing the moisture-saturated air surrounding the potato strips thereby effecting surface drying and "fluffing" of the potato strips to give a mealy appearance.

The potatoes were then fed without delay, and while still hot, to a conventional mashing machine, commonly called a ricer, comprising a hopper into which the potatoes were dropped and a conical screw conveyor which served to withdraw the potatoes from the base of the hopper and forced them through the perforations in a perforated conical screen closely surrounding the screw conveyor.

In the formation of a commercial product suitable additives, well known in the art, could be introduced at this point for ensuring a desired texture, flavour, colour, stability and odour of the final product.

The mashed potato falling through the perforated conical screen of the mashing machine was fed to a double drum drier, the rotating drums of which had a length of 7.75 inches and a diameter of 6 inches. Steam under 30 lbs. pressure was supplied to the interior of each of the drums. The clearance between the drums was between about .003 and about .004 inch and the drums rotated at a speed of about 4 revolutions per minute.

A continuous but perforated layer of mashed potato formed on the surface of each drum. In appearance the layer resembled a lace work or felted fibrous structure having a random orientation of the fibers. Knife scraper devices were used for removing the layers from the drums each of the layers having been in contact with the associated drum for a period of about 10 seconds prior to its removal from the drum.

The layers of dried mashed potato thereby obtained were readily disintegrated by slight mechanical force into a mass of crystal-like particles resembling snow crystals. This product contained about 8 percent moisture. The moisture content could however be reduced below this value by operating in an environment the humidity of which was more carefully controlled than that used in the present example.

The product could be reconstituted by admixture with a suitable amount of water or milk or a milk-water mixture. Preferably the liquid employed for reconstitution is at a temperature somewhat above room temperature, for example about 180° F. The texture and flavour of the reconstituted product were found to be excellent.

A sample of the crystal-like particles obtained by the method of the above example were examined microscopically. The thickness of the particles was on the average from about 3 to about 4 potato cell thicknesses.

There is evidence that during the drying of the layer of mashed potato while it is in contact with the heated drum, reorientation of some of the potato cells takes places because of the rotation of the drums. As a result, the thickness of the crystal-like particles appears to be highly variable but on careful examination it is found to be of the order of about 3 to about 4 potato cells typical of the crystal-like particles present invention.

We claim:

A process for the production of an instantly reconstitutable dehydrated cooked mashed potato product having a multi-cellular thickness comprising the steps in order of:
  (a) thoroughly cooking for ready mashing relatively small peeled pieces of potato having a cross-section of approximately three-eighths of an inch by three-eighths of an inch in an aqueous medium selected from the class consisting of steam and water for a period of about six to about fifteen minutes at a temperature in the vicinity of the boiling point of water until cooking thereof is effected;
  (b) separating the thus-cooked pieces of potato from the hot cooking medium;
  (c) rapidly removing surface moisture from said cooked pieces by causing air to be directed against the surface thereof and imparting a mealy appearance thereto;
  (d) mashing the resulting cooked pieces of potato freed of surface moisture to form mashed potatoes;
  (e) extruding said cooked mashed potatoes between a pair of rolls having a forming zone therebetween with a gap setting between .002 and .004 inch, at least one of said rolls being heated;
  (f) drying thus extruded mashed potatoes in a layer on said heated roll, and
  (g) collecting a dehydrated mashed potato product from said heated roll, said product having an open porous texture, a crystal-like appearance and an average thickness of three to four potato cells.

(References on following page)

References Cited by the Examiner

UNITED STATES PATENTS

| | | | |
|---|---|---|---|
| 1,025,373 | 5/1912 | Cooke | 99—207 |
| 2,759,832 | 8/1956 | Cording et al. | 99—207 |
| 2,780,552 | 2/1957 | Willard et al. | 99—207 |

OTHER REFERENCES

Talburt et al., Potato Processing, 1959 (pp. 260, 289, 329, 359, 360).

U.S. Dept. of Agriculture, ARS-73-2, Nov. 15, 1954. Potato Flakes; a New Form of Dehydrated Mashed Potatoes.

A. LOUIS MONACELL, *Primary Examiner.*

ABRAHAM H. WINKELSTEIN, HYMAN LORD, *Examiners.*

G. N. MANN, S. J. BAICKER, *Assistant Examiners.*